(12) United States Patent
Sulc (10) Patent No.: US 9,743,404 B2
(45) Date of Patent: *Aug. 22, 2017

(54) SYSTEM FOR WIRELESS MESH NETWORK COMMUNICATION

(71) Applicant: MICRORISC s.r.o., Jicin (CZ)

(72) Inventor: Vladimir Sulc, Sobotka (CZ)

(73) Assignee: MICRORISC s.r.o., Jicin (CZ)

( * ) Notice: Subject to any disclaimer, the term of this patent is extended or adjusted under 35 U.S.C. 154(b) by 51 days.

This patent is subject to a terminal disclaimer.

(21) Appl. No.: 14/931,242

(22) Filed: Nov. 3, 2015

(65) Prior Publication Data

US 2016/0128063 A1    May 5, 2016

Related U.S. Application Data

(63) Continuation of application No. 14/168,443, filed on Jan. 30, 2014, now Pat. No. 9,179,498, which is a continuation of application No. 13/303,192, filed on Nov. 23, 2011, now Pat. No. 8,681,656.

(30) Foreign Application Priority Data

Nov. 26, 2010  (CZ) ...................... 2010-873

(51) Int. Cl.
*H04W 72/04* (2009.01)
*H04W 40/38* (2009.01)
*H04L 29/12* (2006.01)
*H04W 40/20* (2009.01)
*H04L 12/717* (2013.01)
*H04L 12/753* (2013.01)
*H04W 84/20* (2009.01)

(52) U.S. Cl.
CPC ......... *H04W 72/0446* (2013.01); *H04L 61/35* (2013.01); *H04W 40/20* (2013.01); *H04W 40/38* (2013.01); *H04L 45/42* (2013.01); *H04L 45/48* (2013.01); *H04W 84/20* (2013.01)

(58) Field of Classification Search
None
See application file for complete search history.

*Primary Examiner* — Gary Mui
(74) *Attorney, Agent, or Firm* — Patent GC LLC (57) ABSTRACT

A general wireless mesh network of communication devices with packet message transmission, especially for telemetry and automation, includes at least a single control communication device and a set of slave communication devices. The control communication device searches in the network and assigns a virtual routing number to each slave communication device. The virtual routing number reflects a distance of the slave communication device from the control communication device, expressed by the number of routings, and is stored in the slave communication device. The slave communication device, for further routing of packets in the mesh network, uses time slots assigned according to the difference between said virtual routing number and the virtual routing number of the sender of a received packet. Packet routing is based on successive flooding of the virtual routing structure and time division multiplexing.

20 Claims, 4 Drawing Sheets

SYSTEM FOR WIRELESS MESH NETWORK COMMUNICATION

RELATED APPLICATIONS

The subject matter of this application is related to Czech Republic application 2010-873, filed Nov. 26, 2010, U.S. application Ser. No. 13/303,192, filed Nov. 23, 2011, and U.S. application Ser. No. 14/168,443, filed Jan. 30, 2014, all of which applications are incorporated herein by reference in their entireties.

FIELD

The present invention is related to the configuring a wireless mesh network of communication devices with package message transmission, especially in wireless networks designated for telemetry and automation, and routing packet message transmission in such a network.

BACKGROUND

In wireless mesh networks of communication devices, messages are sent in small parts called packets. Packets contain information about their recipient and are transmitted in general mesh networks from the sender to a sequence of devices until they reach the recipient. Defining the path, i.e. deciding which devices the packets will be transmitted through, is called routing. The goal of routing is to ensure the most reliable and fastest possible delivery of the packet from the sender to the recipient.

Mesh networks represent the most general network topology, where in general connections may exist between any two devices in the network, which means that these devices may mutually communicate and transfer messages. A mesh network where a connection can be established between any two devices in the network is called a fully connected mesh network; however, in practice the much more frequent case is that only some devices may establish mutual connections. The simplest example for a mesh network and routing is imagining the network as cities which are interconnected by the road network and routing as the journey of a vehicle with its cargo (the packet) from the city of the sender to the recipient. The vehicle travels from one city to another utilizing the existing road network. Individual roads connecting cities represent the connections between them. The whole journey from the starting point to the endpoint is thus divided into individual roads, which we call connections in the context of general networks. In the listed example there exist many different routes which the vehicle can use to transport the cargo from the city of the sender to the city of the recipient, and similarly in wireless real-world mesh networks there can exist many different routes for routing the packet from the sender to its recipient.

Since general mesh networks may or may not contain a connection between any pair of devices, the number of total possible connections in a network with n devices will always be lower or equal to Nmax where $Nmax=n*(n-1)/2$. In the concrete example with cities, this is the maximum number of roads in the road network between n cities.

In wireless mesh networks, devices communicate wirelessly, generally via radio waves. Connections between two communicating devices are thus usually limited by the range of these devices. Devices which are too far from each other cannot establish a mutual connection. Since the distances between individual devices are not usually known in advance in general wireless mesh networks, it is not clear in advance which devices may establish mutual connections, and thus routing, i.e. finding the route between the sender device to the recipient device of the packet, is a relatively difficult algorithmic problem, especially due to the number of possible routes and combinations of various connections.

Various routing methods for communication in mesh networks are used in practice. These include for instance routing based on routing tables, often used in computer technology, flooding or random routing. Routing based on sharing and distribution of routing tables or vectors is one of the most optimal methods with respect to the efficiency of packet delivery, however this comes at the cost of high requirements on the memory of the control processor or microcontroller of communication devices, especially in large networks with many devices. Flooding an unordered network, based on distributing a packet gradually into the whole network is a solution suitable for the reliable delivery of the packet, however is far from optimal due to the specific properties of wireless networks, which generally have low data transfer speeds and problems with media sharing (conflicts in media access and their solution). In the example above, this approach would mean traversing the whole road network in our vehicle. Random routing is used in computer technology e.g. when the router is overloaded and may reduce packet loss, but is not suitable for wireless mesh networks for telemetry due to its low reliability.

Contrary to connected systems, where individual devices may have dedicated connections between them, wireless mesh networks share the communication spectrum. Inappropriate use of the communication spectrum and non-adherence to communication rules would lead to collisions of individual communication connections, preventing efficient communication. In our example with the road network, this would be analogous to the chaos and collisions leading to the closure of many roads which would occur if vehicles didn't follow rules such as which side of the road to use and which vehicle takes precedence.

Various techniques to prevent collision states are thus used for communication in wireless networks. The most frequently used methods are to define rules on WHEN each device may transmit (so-called Time Division Multiplexing or Time Division Multiple Access—TDMA) and also WHERE each device may transmit, i.e. which frequencies (usually specified by a channel) may be used by each communication device. Other techniques for media/spectrum access are also used in practice. CSMA, CDMA, TDMA or TMPS are only a few examples.

TDMA is often used in practice to prevent transmission collisions due to its easy implementation and reliability. TDMA is based on the fact that in a given time interval, called a time slot, only a single specified device may transmit. A group of time slots belonging to different participants is called a frame. On our road network example, the easiest way of illustrating this approach is using traffic lights, which limit traffic on shared crossroads in time-defined intervals.

Since most RF circuits today allow receiving and sending on several frequencies, many systems also utilize frequency hopping (FHSS—Frequency Hopping Spread Spectrum), where either individual bits or, more commonly, groups of bits are transmitted on different frequencies. In practice this means that they may be transmitted simultaneously, since they do not interfere with each other. This manner of communication may be illustrated in our example as having multi-lane roads between cities, where several vehicles may drive on a single road simultaneously.

As mentioned above, a general mesh network with n communication devices allows at most Nmax connections between communication devices, where Nmax=n*(n−1)/2, with n being the number of communication devices in the network. Since the topology of a general wireless mesh network is not known in advance, the limit case of applying collision-free flooding via TDMA would require dedicating up to Nmax time slots for individual routings to ensure reliable delivery of the packet. However, this would be very time-inefficient. For instance, for the commonly used speed of 19.2 kbit/s, the transmission of a single short packet with 24 B of data in a network with 100 communication devices would result in a frame of up to 50 seconds.

Wireless mesh networks are becoming increasingly popular for telemetry and automation as well as for many other applications. The areas of long-range reading of measuring devices, control of public lighting or distribution monitoring are good examples. In these cases the networks comprise hundreds or thousands of devices, which leads to an immense pressure on the price of communication devices and also on ensuring reliable and fast message delivery. Creation of a functional layout of the wireless network using packet transmission and comprising tens, hundreds or thousands of devices is an immensely difficult algorithmic process due to the gigantic amount of various layouts of such a network. This is further complicated for networks comprising communication devices with limited hardware resources (program and data memory) and communicating at low speeds, especially in the case of multiple-routing, i.e. the transfer of messages from one device to another.

Various techniques for obtaining the layout of wireless mesh networks and routing algorithms are the subject of scientific research. For instance, a conference was held in 2010 in Venice (http://www.iaria.org/conferences2010/MESH10.html).

Commercially available implementations of protocols supporting wireless mesh networks also exist. One example is Zigbee (http://www.zigbee.org), which implements the IEEE 802.15.4 standard. Another example is the SmartMesh technology of Dust Networks (http://www.dustnetworks.com). The demands on processor resources, and especially high requirements on the program and data memory of the microcontroller, has led to many attempts to limit the number of supported devices and routings in the network, which would significantly simplify implementation. One example of such a technology is MiWi (http://www.microchip.com/miwi), which is again based on the IEEE 802.15.4 standard but limits the number of routings to 4. The main reason for the high memory requirements is the fact that most technologies use routing tables for routing. Their size grows proportionally to the number of supported devices and the number of possible routings in the wireless mesh network.

The small number of possible routings, limited number of communication devices in a single network, low efficiency of collision algorithms, and the high requirements on used hardware prevent the application of many solutions in large networks requiring hundreds or thousands of communication devices connected in a general wireless mesh networks.

SUMMARY

An aspect relates to a method of creating a functional layout of a wireless mesh network of communication devices with package message transmission, especially in wireless networks designated for telemetry and automation, which includes at least one control communication device and a set of slave communication devices. The control communication device discovers, through the network, and gradually assigns a unique virtual routing number to, each slave communication device. The unique virtual routing number is stored on the slave communication device, and represents the distance, i.e. number of routings, of this slave communication device from the control communication device. Each slave communication device is then assigned a time slot when it is active for further routing of message packets in the mesh network, where this slot is assigned based on the difference between the virtual routing number corresponding to the receiving communication device and the virtual routing number of the connecting packet sender.

Based on an analysis of the discovery of the mesh network by the control communication device, one embodiment allows the designation of the order of assignment of virtual routing numbers to individual slave communication devices and their assignment into the routing structure of the mesh network or their removal from this structure. The assignment of virtual routing numbers to individual slave communication devices can also be stored in the memory of the control communication device. Each slave communication device with an assigned virtual routing number may additionally store an identifier of the mesh network discovery.

Another embodiment allows the assignment of unique virtual routing numbers only to those slave communication devices which are designated for routing message packets in this network, or only such slave communication devices are discovered.

Another embodiment stores, in each slave communication device with an assigned virtual routing number, identification, e.g. the network address or virtual routing number, of a parent communication device which is closer to the control communication device in the mesh network.

Another aspect is the method of response of communication devices in a thus ordered general wireless mesh network, where the responding communication devices route messages back to the control communication device so that their transfer includes irredundant routing through the parent/child structure of the tree topology. Here, the possibility of choosing a suitable routing process for the response based on the concrete application is especially advantageous and unique.

Another aspect is the manner of routing packet transmission of messages in general wireless mesh networks ordered in accordance with the properties listed above (based on TDMA in a thus ordered wireless mesh network and utilizing found slave communication devices for routing based on assigned virtual routing numbers), which is based on the gradual flooding of the whole virtual routing structure and utilizes multiple access with time division. Each communication device in the virtual routing structure receives a time slot in the frame assigned to this device based on the previous receipt of a packet containing the virtual routing number of the sender in accordance with the difference between its virtual routing number and the virtual routing number of the sender. The length of the frame can be limited based on the difference between the virtual routing numbers of the sender and recipient of the message. The routed message packet may be sent sequentially, at least twice in sequence and on at least two different frequencies.

Assignment of the appropriate time slot to the slave communication device performing active routing, i.e. capable of forwarding packets carrying the virtual routing number of the last sender device, will be carried out automatically by each communication device with an assigned virtual routing number, without the need to share a routing table or vector and without knowledge of the neighborhood. This is carried out based on knowledge of the assigned virtual routing number and the virtual routing number of the sender included in the message. Each found communication device is active (i.e. will perform routing) only in the time slot the device calculates based on the difference between its virtual routing number and the virtual routing number of the connecting packet sender.

Creation of a functional layout of a general wireless mesh network with packet transmission and routing techniques in this network in accordance with this invention jointly ensures efficient and reliable delivery of packets, without large requirements on resources of the controlling microcontroller, and thus substantially reduces the disadvantages of large implementation demands, simplifies realization and thus reduces the cost of communication devices. The manner of routing described in this patent application is based on using a time multiplex.

DESCRIPTION OF THE DRAWINGS

The attached figures schematically display an example implementation of the mesh network configuration and routing.

DETAILED DESCRIPTION

Figure 1A:
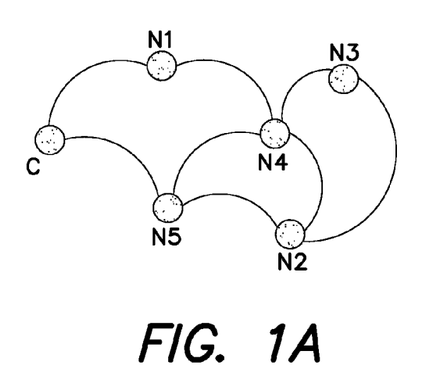
FIG. 1a displays an example of an unordered mesh network.
Figure 1B:
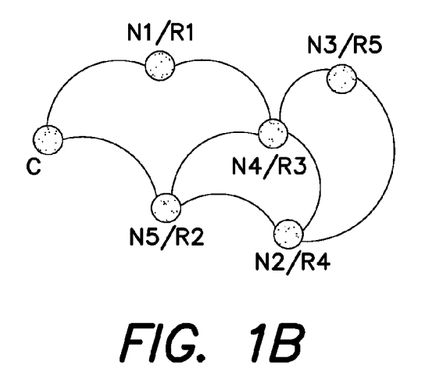
FIG. 1b is an example of an ordered mesh network.
Figure 1C:
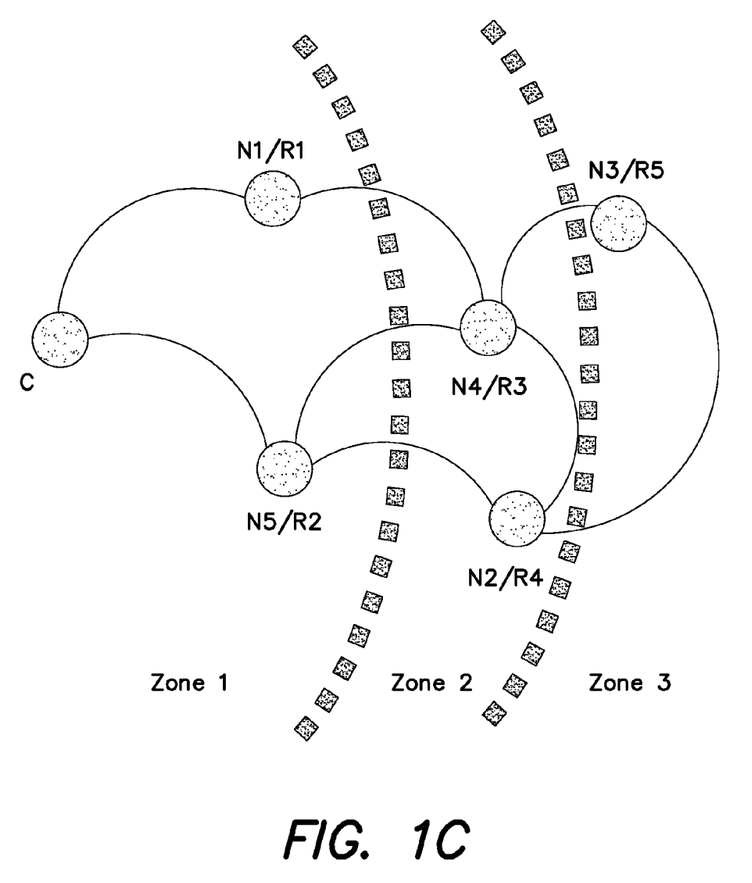
FIG. 1c contains the ordered mesh network from FIG. 1b with zones representing the minimal number of routings to the controlling communication device.

The method of creating a functional layout of a wireless mesh network of communication devices with packet message transmission and routing in such a wireless mesh network are based on the creation and use of a newly created virtual routing structure, i.e. a set of communication devices N with an assigned virtual routing number VRN. Contrary to many conventional methods of network communication, which use the same addresses or their short forms for addressing (identifying the recipient of a packet) and for routing (determining the route), this solution for addressing N communication devices uses the public network address (e.g. MAC address, the address assigned on connection to the network or another address used in the network) for addressing, however network routing is performed based on a unique virtual routing number, assigned by a control communication device C to a slave communication device N. FIGS. 1a, 1b and 1c show examples of an unordered and ordered mesh network. These figures markedly illustrate that each discovered slave communication device N (with addresses N1 to N5) was assigned a unique virtual routing number VRN, specifically R1 to R5.

The new network ordering, i.e. creation of a new virtual routing structure as a set of communication devices N with assigned virtual number VRN, may be implemented based on at least a single network search. The network discovery itself and assignment of virtual routing numbers VRN may be implemented for instance by having the control communication device C first send an ANSWERME message, to which all slave communication devices N which receive the message will reply. The control communication device can then determine which devices N are in range and may establish connections. These devices are then sequentially, e.g. based on their public address, assigned an increasing virtual number VRN, which is saved by the communication devices N and used in routing. The control device C then sequentially sends a DOSCAN message to all slave communication devices N found in its vicinity, to similarly find other N devices in their vicinity and return the results. The control communication device C can then in the next iteration cycle similarly send the DOSCAN message to all other slave devices N found in the previous cycle. This process will repeat until all communication devices N in the network are found or until other limitations are met, such as the number of iteration cycles. This method of discovering the network minimizes the lead on the control communication device C, since it does not require storage of intermediate neighbourhood results. The number of the iteration cycle allows the division of communication cycles into zones, since it expresses the minimal number of routings to each device included in this zone (FIG. 1c). Since each virtual routing number VRN assigned in this way to all found slave communication devices N, which also store this number, is unique in the whole network and since it expresses the distance of this communication device N from the control communication device C, represented by the number of minimal routings (hops), this method functionally orders the network for efficient routing as described below.

The virtual routing number VRN, corresponding to the distance from the control communication device C, can be assigned e.g. by storing the number of the iteration cycle which led to the discovery of the communication device N and which directly corresponds to the number of routings from the control communication device C in the top byte of this number, and storing a distinguishing index ensuring uniqueness in the bottom byte. However, in many cases it is more advantageous to gradually assign VRN numbers by a sequence incrementing by one, which is a practically viable solution especially with respect to the simple realization of subsequent routing. Since the virtual routing number VRN will be assigned sequentially in accordance with the sequence of its discovery based on the discovery described above, the condition necessary for efficient network ordering will remain valid. Specifically, the condition is that each assigned VRN in discovery iteration cycle x will be lower than each VRN assigned in cycle x+1, i.e. that for all virtual routing numbers VRN it will hold that $VRN_x < VRN_{x+1}$. The numbering can also be performed by other means, such as assignment of characters. A limitation and important prerequisite is that the numbering used for routing must preserve uniqueness and must reflect the distance from a single point in the network. The described method is related to the control communication device C. The listed condition on the ordering, $VRN_x < VRN_{x+1}$, reflects the distance of the communication device N from the control communication device C and allows the division of found communication devices N into zones (see FIG. 1c).

Due to the time optimization of the whole network discovery process, the DOSCAN message can include information about yet-to-be-found communication devices N and also about the currently highest assigned VRN. The purpose of this is to allow a communication device N queried by a DOSCAN message to assign unique VRNs to the communication devices N it discovers without the need to query the control communication device C. Since the VRN will still be assigned sequentially in the order of discovery, the condition for efficiently ordering the network $VRN_x<VRN_{x+1}$ still holds.

The described method for creating a functional ordering is designated especially for larger networks comprising a large number of communication devices. It may also be realized in an atomized network, i.e. a network divided into smaller parts, by ordering these smaller networks in the described manner and then ordering these smaller networks based on their distance from the referential communication device C. This method of obtaining a new functional ordering for wireless mesh networks is especially suitable for static networks, for instance a network of public lighting, may form a part of the installation procedure or could also be initiated later or even dynamically, for instance due to a request to expand the network.

If there is enough memory available for storing intermediate results, it is not necessary to assign the VRN to individual discovered devices during the network discovery, and it may be postponed to the end of the discovery and following analysis of stored intermediate results. This method may be advantageous e.g. for optimization of a created routing structured based on the signal strength (RSSI) of individual connections. In this case, assigning the VRN must be carried out so that all assignments conform with the condition for efficient network ordering: $VRN_x<VRN_{x+1}$.

If there is enough memory available for storing intermediate results and a detailed analysis of the network topology is possible, the routing structure may be optimized by excluding all discovered communication devices N which are not suitable for routing from the routing structure, such as those which are only capable of establishing a single connection. After excluding a communication device N from the routing structure, the VRNs of all devices which are higher than the VRN of the excluded communication device N should be decreased so that the condition for efficient network ordering $VRN_x<VRN_{x+1}$ still holds. Exclusion from the routing structure may be carried out e.g. by removing the VRN or its configuration to a certain value which is considered invalid. The described optimization will reduce the number of communication devices included in the virtual routing structure and thus will also lead to improved time efficiency of routing when utilizing this routing structure.

If there is enough memory available, the control communication device C can store VRN assignments to individual communication devices N. For instance, it could be advantageous in practice to store assignments by the used network address. Knowing the VRN of the addressed device will then allow further optimization of routing by limiting the number of hops, i.e. creation of a lower number of time slots, which in effect shortens the frame. Storing can also be realized in external memory outside of the control communication device C, if available.

In case of an assumption of multiple network discoveries, it could be advantageous to store a distinguishing identifier (DID) together with the appropriate VRN in all found slave communication devices C. This identification may subsequently be used when routing, e.g. to prevent eventual conflicts caused by using the same VRNs assigned in different discoveries, e.g. due to the unavailability of some devices during the subsequent discovery. This method removes possible VRN duplicities.

If only some slave communication devices N in the network are dedicated for routing, their number will be $n_R$ and for all other communication devices there will exist a connection to at least one such device, the size of the virtual routing structure will decrease leading to a decrease of the number of dedicated time slots in a frame to $(n_R-1)$ while still keeping the addressing option for all n communication devices. If $n_R$, i.e. the number of communication devices dedicated to routing, is much lower than the total number of communication devices in the network n, this will lead to a dramatic decrease in the time requirements of routing. For instance, this option may be used in practice for metropolitan networks, where the basic routing structure will be formed by communication devices providing administration of public lighting, whereas within this network it will be possible to address many additional devices, e.g. for automatic reading of energy, water, gas consumption etc.

Since storage of VRNs and eventually also other information, such as identification of the discovery cycle (DID), is always realized through the communication device N nearer to the control communication device C (e.g. in the described example of solution through the device which received an answer to its ANSWERME message), identification of this parent device (PADDR) may also be available during storage, specifically this could include its network address or its VRN. In case of its storage, it is possible to use it later e.g. for quick routing from the slave communication device N to the control communication device C, whereas the routing itself will be carried out through the parent communication device which is identifiable and addressable by the stored information (PADDR). The listed example of a possible implementation, with low demands on processor resources, the principle of a single parent is ensured. However, if there is an abundance of resources it is possible to search and save the addresses of other parents and subsequently use them for alternative distributed routing based on a tree topology.

The routing method is based on using the created virtual routing structure in combination with the TDMA method (multiple access with time division), jointly ensuring routing via a sequential and efficient flooding of the network controlled by a data flow based on VRNs. The time slot when each device is active (i.e. when it may perform routing and confirm the receipt of message packets) is in this case linked to its assigned VRN. As was mentioned above, it is advantageous for routing to assign VRNs in a numerical sequence increasing by one. In this case it is possible to assign a time slot to each communication device N based on its VRN without recalculation. The number of possible time slots depends on the size of the created virtual routing structure in a single frame, i.e. the number of communication devices N listed in the virtual routing structure. It can be proved that after ordering a network with n slave communication devices N in accordance with the description listed above, (n−1) time slots are sufficient to reliably deliver a message packet by sequential flooding from the control communication device C. This significantly reduces the time requirements of the whole process of routing in comparison to flooding an unordered wireless mesh network. Additionally this method of routing provides a high reliability of delivery. In case any part connection fails, the existing redundant connections provide a high probability that the failure of that part connection will not lead to the non-delivery of the packet. This network property is called "healing" in literature. Although individual communication devices N in the network are not time-synchronized (there exists no absolute measure of time), the properties of the network configuration and including the VRN of the sender into the packet allows for a calculation of the time slot belonging to the routing communication device N in relation to the time of the receipt of the packet based on computing the difference between the VRN of the sender of the packet and the VRN of its recipient. The first sender is automatically assigned the first time slot of the frame.

In the case of the described network configuration in combination with storing the relationship between a communication device N and the VRN (see above), it is possible to further reduce the number of time slots necessary for the reliable delivery of a packet based on the knowledge of the VRN of the addressed communication device N. In this case the average number of time slots necessary for a reliable delivery of the packet from the control communication device C to any of the slave communication devices N will be further reduced, on average by one half within the whole network. Based on knowledge of the VRN of the addressed device together with information about the minimum VRN assigned in the same discovery cycle, it is further possible to reduce the number of time slots within the frame addressed to the concrete communication device N to this minimal amount. The time savings in the routing process are obtained at the cost of suppressing possible and alternatively usable connections to devices with a lower VRN than the VRN of the addressed device belonging to the same zone.

In case of implementing at least a single frequency jump within one time slot, i.e. use of more than a single frequency (channel) for repeated sending of packets, the number of redundant connections and thus the probability of packet delivery will increase. This significantly increases the reliability of the system, especially in case of interference in one channel, e.g. due to possible interference with another system.

The above listed description illustrates that knowledge of specific information and the possibility of using different techniques of communication allow us to choose different routing methods based on concrete requirements of various applications as well as on the advantages provided by these techniques. For instance, knowledge of the parent allows the use of an irredundant, although in the given configuration fastest, routing through the parent/child structure (a so-called tree topology). In practice it could be very advantageous to combine different routing methods based on their purpose, as long as they are supported and available in the system. For instance, confirmation of packet delivery could be realized first by quick routing through parents followed by, in case of failure, reliable yet slower routing.

The method of creating a new functional ordering of a wireless mesh network of communication devices and the routing method in this ordered wireless mesh network may be implemented practically in any microcontroller, specialized RF circuit or custom chip controlling a wireless communication device, due to the low associated memory requirements.

Figure 2:
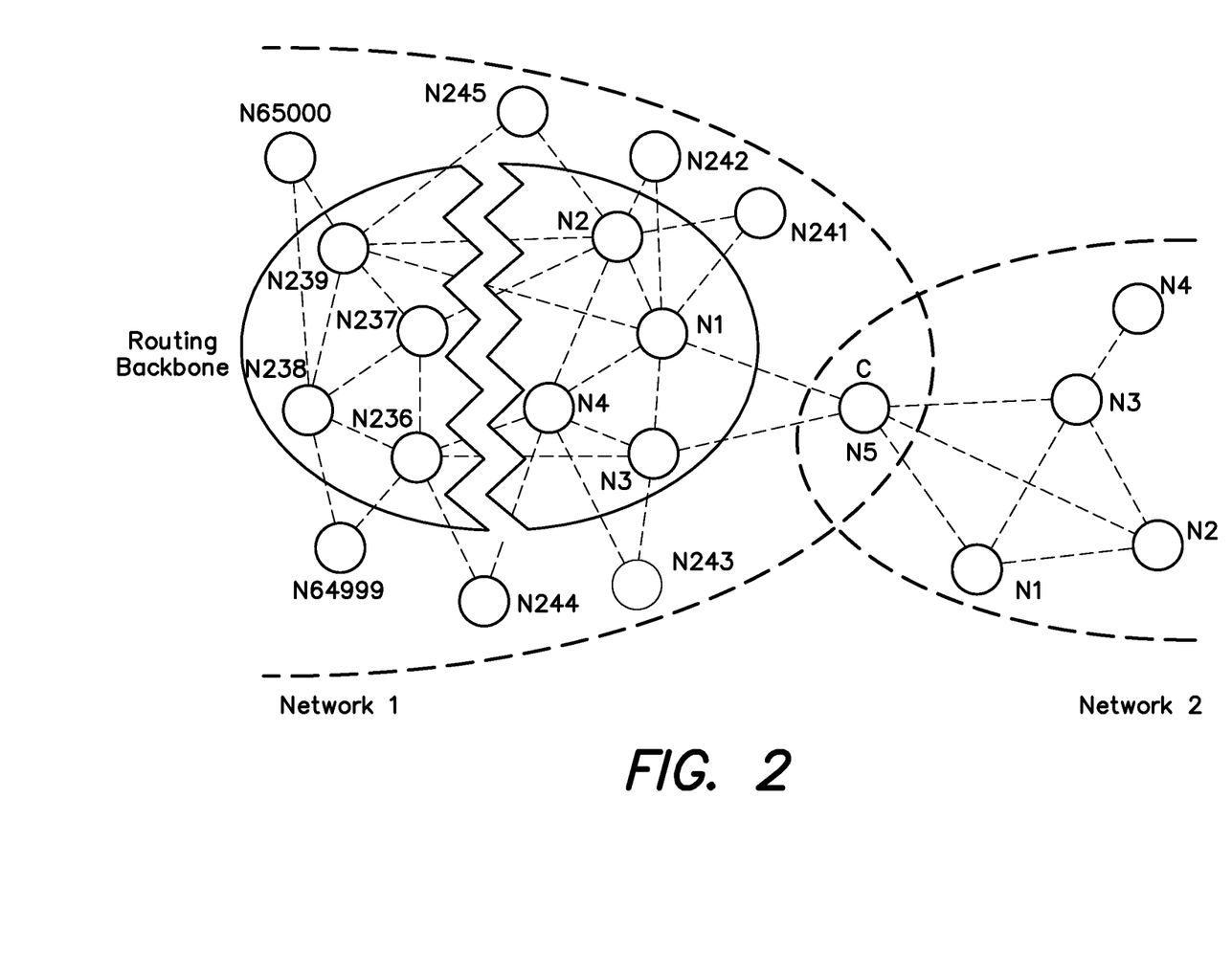
FIG. 2 displays an example of the concrete realization of creating a functional layout of a wireless mesh network.
Figure 3:
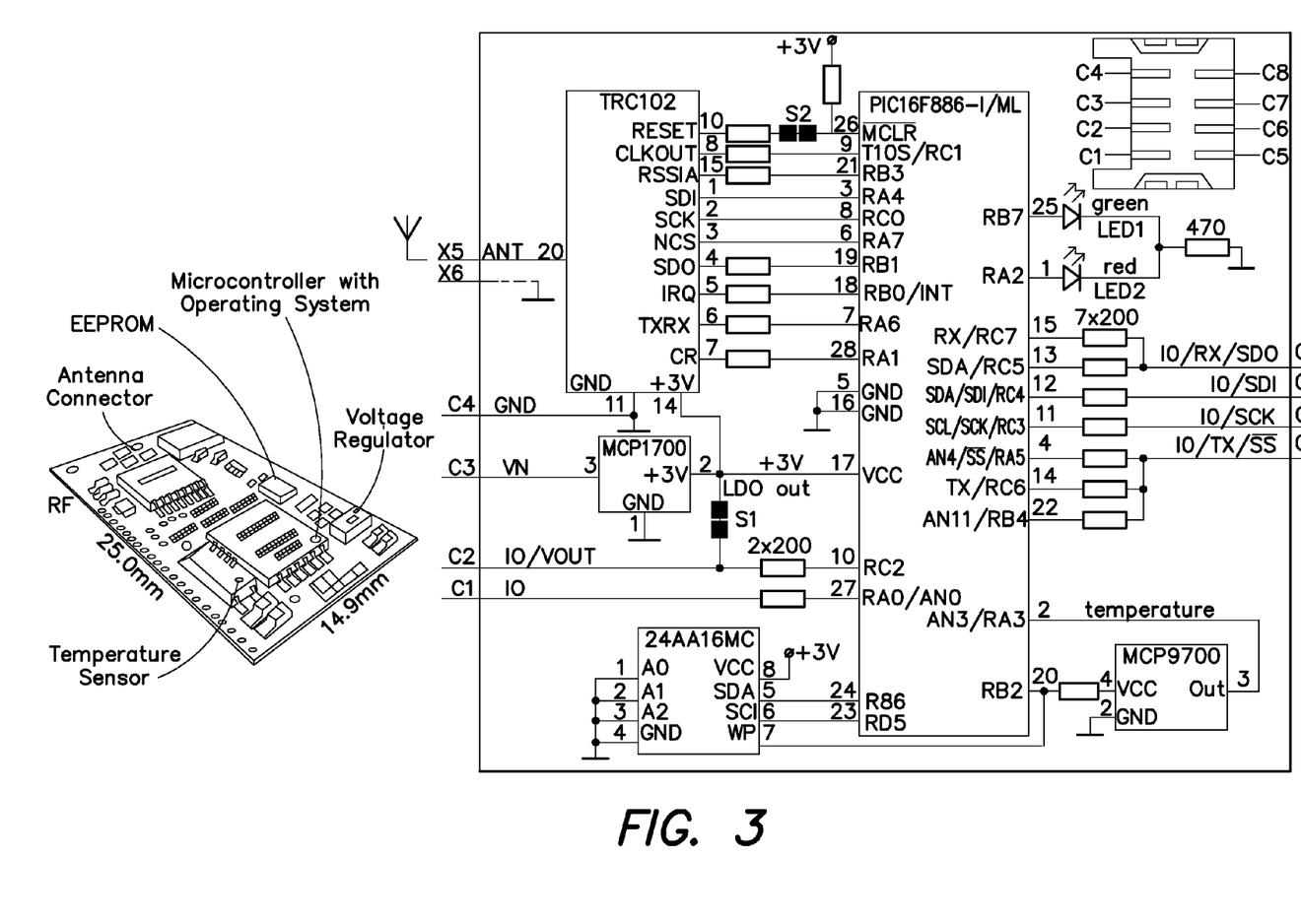
FIG. 3 contains an example of a simplified implementation and construction layout of a transceiver module, which is capable of working both as a control communication device and as a set of slave communication devices.

The example described below shows a concrete practical implementation in accordance with FIG. 2. The whole solution was implemented in a TR-52B transceiver module. The simplified diagram and construction configuration of the module are provided in FIG. 3. Since module TR-52b is capable of working both in Coordinator mode (i.e. as a control communication device C) and in Node mode (i.e. as a slave communication device N), see e.g. CZ utility design 18340, CZ patent 301322 and EP 2071731 (all hereby incorporated by reference), it is possible to implement both parts of the whole solution into a single module (specifically into the program memory of its microcontroller); this means that the module contains both the method for creating a network ordering by a control communication device C and the actual implementation of routing performed by slave communication devices N.

To maintain compatibility with lower versions of the IQRF OS implementing functionality in accordance with CZ utility design 18340, CZ patent 301322, EP 2071731, CZ utility design 16181, patent application CZ2005-616, EP 1768268 and US patent application 20070188343 (all hereby incorporated by reference), and supporting only 240 communication devices in a single network (one control communication device C and up to 239 slave communication devices N), a configuration was chosen which utilizes the advantages of this invention so that the original structure used for addressing and simultaneously for routing is now dedicated only for routing. By expanding addressing options from the original 1B addressing and separating addressing and routing in accordance with this invention, an optimized solution for metropolitan networks was obtained. The solution comprised a basic routing structure with up to 239 routing communication devices and simultaneously included the option to address up to 65536 communication devices connected in a single network. To retain backward compatibility with lower versions of IQRF OS, the basic structure of the packet was left intact and is as described e.g. in patent application US 20090156141 (hereby incorporated by reference), whereas the addressing extension itself is placed in the part of the packet designated for routing.

General packet structure:

| PIN | DLEN | CRCH | [NTW INFO] | [CRCN] | DATA | CRCD | CRCS |

Original structure of NTW INFO for network packets:

| RX | TX | NID0 | NID1 | PID | [RTOTX] | [RTDEF] | [RTV0] | [RTV1] | [RTV2] | [RTV3] | ... |

| ... | [MPRW0] | [MPRW1] | [MPRW2] | [CRYPY0] | [CRYPT1] | [AUX0] | [AUX1] |

Single-byte addressing was used for addressing within the network and for routing, with the last sender of the packet identified by the TX byte and the recipient by the RX byte. The RTDEF byte, used to identify the routing algorithm, had to be set to zero for routing, and bytes RTV1 to RTV3 were used to define the routing vector, i.e. the sequence of four communication devices N the packet is to be routed through. The flexibility of the original solution allowed a simple extension of the addressing space while retaining backward compatibility. New methods of routing based on a solution in accordance with this invention are supported for RTDEF !=0.

New structure of NTW INFO for network packets:

| RX | TX | NID0 | NID1 | PID | [RTVRN] | [RTDEF] | [RTDT0] | [RTDT1] | [RTDT2] | [RTDT3] | ... |

| ... | [MPRW0] | [MPRW1] | [MPRW2] | [CRYPY0] | [CRYPT1] | [AUX0] | [AUX1] |

As the name suggests, the RTDEF byte is used for defining the method of routing and addressing the packet in the network. Concrete implementations support one-byte and two-byte addressing. The TX byte carries information about the network address of the original sender of the packet, which is important for the packet recipient but not for the devices routing the packet. The RTVRN byte contains information about the virtual routing number VRN of the packet sender. The VRN is used for routing and identifying the time slots for each particular communication device N. To simplify the implementation, the control communication device C also uses a VRN, specifically RTVRN=0. The RTDT0 byte contains information about the maximum number of routings to limit the total length of the route and reduce the response time of the system. Thus it defines the size of the frame by the number of slots. Using such a solution can reduce the average time of routing in a network to one half. Since the virtual routing numbers VRN are only available in IQRF OS, the function optimizeHOPS( ) was implemented into IQRF OS. The function limits, for each recipient identified by the RX byte, the number of routings in accordance with the VRN of the packet recipient and automatically sets the RTDT0 byte. The RTDT1 byte is user-defined and allows setup of a time slot in ticks. The current version of IQRF OS defines one tick as 10 ms. The option of custom-configuring the length of a time slot significantly increases the variability and applicability of the whole solution. The RTDT2 byte contains identification of the discovery cycle (DID) and, when used together with a solution in accordance with this invention, will prevent possible collisions in case of multiple system discoveries. The RTDT3 byte is used for extended two-byte addressing (separation of addressing and routing).

The described solution has each slave communication device N in the routing structure store their parent address PADDR, which allows this communication device to quickly respond e.g. to messages of the control communication device C by sending the message with a minimum number of hops through the parent of each routing communication device (thus reducing the mesh topology to a TREE topology in this routing).

Figure 4:
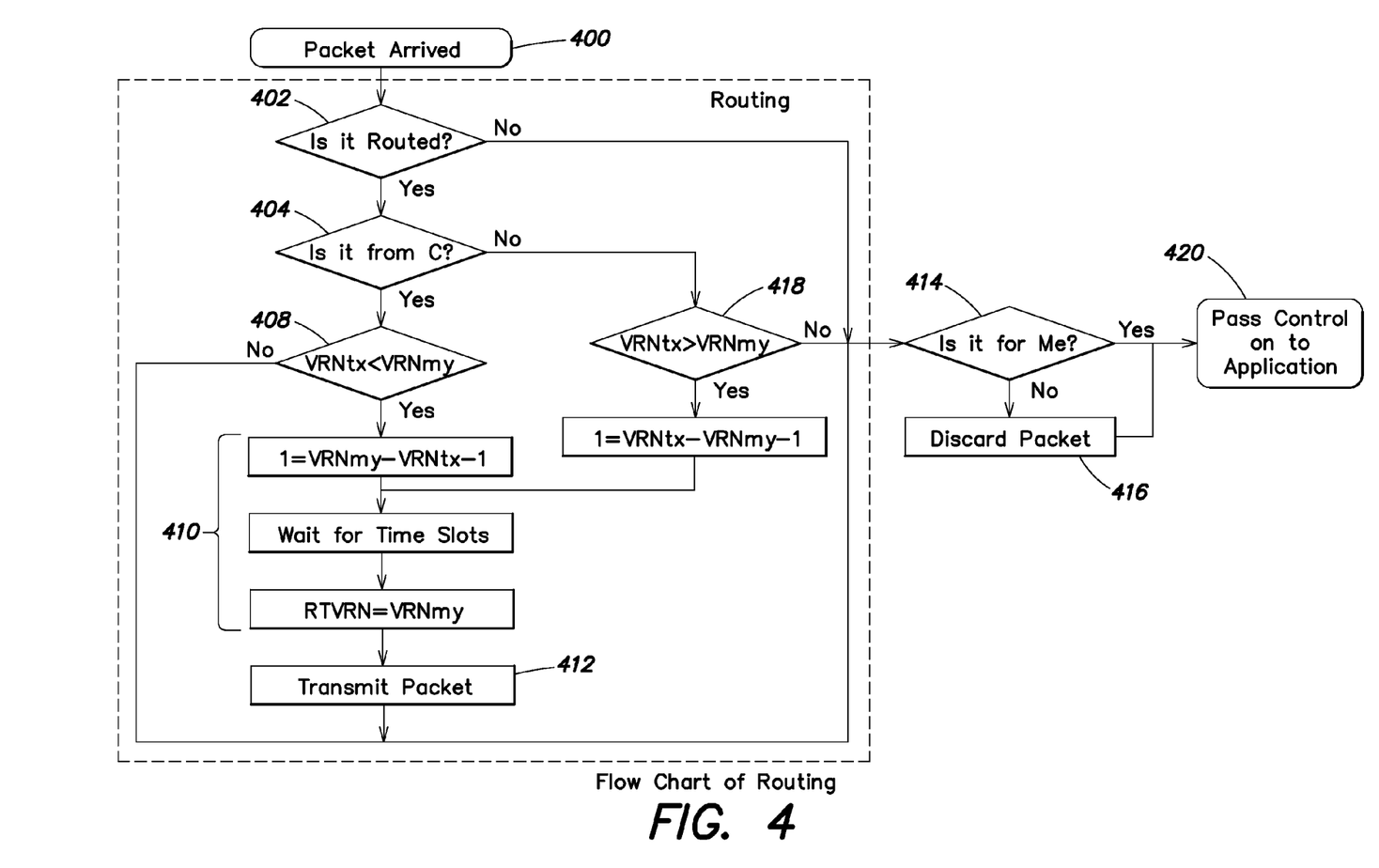
FIG. 4 shows a flowchart of an example of routing in a wireless mesh network.

Routing itself (see above) works as follows: information about the original packet sender (RTOTX), information about the device's own virtual routing number $VRN_{MY}$ and information about the virtual routing number of the sender $VRN_{TX}$ are all available. After a packet arrives 400, and if the packet is a routed packet 402, then the first step is to evaluate 404 whether the sender is the control communication device C (RTOTX==0). If yes and if $VRN_{MY}>VRN_{TX}$ 408, then the device will wait 410 for the end of the current time slot and to its assigned time slot, by waiting RTDT1* ($VRN_{MY}-VRN_{TX}-1$) and then forwards 412 the received packet. Otherwise, if it is not the recipient of the packet 414, it discards 416 the packet. If the packet destination is the control communication device C and if $VRN_{MY}<VRN_{TX}$ 418, then the communication device will wait 410 for the end of the current time slot and to its assigned active time slot, by waiting RTDT1*($VRN_{TX}-VRN_{MY}-1$) and then forwards 412 the received packet. Otherwise, if it is not the recipient of the packet 414, it discards 416 the packet. After the packet is processed, control is passed 420 back to an application. We include a flowchart in FIG. 4 describing the packet routing method for packets sent by the control communication device C and packets designated for the control communication device C sent by any of the communication devices N.

The network discovery itself is realized in accordance with the description listed above. The control communication device C can initiate the discovery process by calling the discovery(x) function, where x designates the maximum number of iteration cycles Network discovery support by slave communication devices N is ensured by calling the function answerSystemPacket( ), called after receiving a system packet, i.e. after returning from the function RFRXpacket( ). The IQRF OS was thus updated with the functionality of handling system packets ANSWERME and DOSCAN. The discovery( ) function may be called repeatedly, which allows the adaptation of the configuration and routing to changing conditions.

The setRoutingOn( ) and setRoutingOff( ) functions added to IQRF S modules are used to determine whether the device will be used for routing and thus whether it will be part of the routing structure. Additionally, in this case this is done dynamically, which may be advantageous e.g. for frequent changes in the network configuration.

As the concrete example of the implementation on TR-52B transceiver modules illustrates, implementing such a solution is easy due to its low hardware requirements. For implementing the whole added functionality of the new functional ordering of the wireless network and new routing method in such a network, less than 2 kW of program memory of the PIC16F886 microcontroller were used.

Such a system may be used for implementing and increasing the efficiency of communication of wireless networks, ensuring wireless communication of electric or electronic devices and other connected devices such as elements of heating systems, security systems or lighting. Such a system is easy to realize, has low hardware requirements, ensures reliable delivery of messages and, due to its support of multiple routing, may be successfully used for telemetry systems, large sensor networks or systems of automatic data reading.

What is claimed is:

1. A method for routing transmissions within a wireless mesh network comprising a plurality of communication devices including a control communication device and a plurality of slave communication devices, the method comprising:
   assigning a unique virtual routing number to each of a subset of the plurality of communication devices; and
   routing a transmission of data between two of the communication devices through one or more of the slave communication devices, wherein each of the one or more slave communication devices:
   receives a wireless transmission of the data from another of the communication devices, the wireless transmission containing a virtual routing number of the other communication device, determines a difference between the virtual routing number of the other communication device and the virtual routing number assigned to the slave communication device, and retransmits the data in an assigned time slot by waiting for a delay based on the determined difference.

2. The method of claim 1, further comprising:

executing a discovery process wherein each of the plurality of slave communication devices is accessed by traversing a wireless communication path from the control communication device to the slave communication device, wherein the unique virtual routing number assigned to each of the subset of the plurality of communication devices is based on a number of hops traversed in the communication path from the control communication device to the slave communication device during the discovery process, and wherein any two virtual routing numbers are capable of being compared to determine that a first of the two numbers is based on a number of hops that is no greater than for a second of the two numbers.

3. The method of claim 2, wherein the virtual routing numbers are numbers assigned sequentially in an order in which the communication devices are accessed during the discovery process.

4. The method of claim 2, wherein each virtual routing number comprises a first portion identifying the number of hops traversed in the communication path and a second portion that is a distinguishing index.

5. The method of claim 1, wherein each of the one or more others of the slave communication devices further:

determines to retransmit the data, as opposed to not retransmitting the data, based on a comparison of the virtual routing number of the transmitting communication device and the virtual routing number assigned to the slave communication device.

6. The method of claim 1, wherein the transmission of data is from the control communication device to one of the slave communication devices.

7. The method of claim 6, wherein a length of a frame including all time slots allocated for the transmission of data is determined based on the virtual routing number of the one of the slave communication devices.

8. The method of claim 1, wherein the transmission of data is from one of the slave communication devices to the control communication device.

9. The method of claim 1, wherein the subset of the plurality of communication devices is a proper subset, and wherein a virtual routing number is not assigned to at least one of the slave communication devices.

10. The method of claim 1, wherein the virtual routing number assigned to each communication device is stored in the communication device.

11. A system for routing transmissions within a wireless mesh network of a plurality of communication devices, the system comprising:

a control communication device, the control communication device being one of the plurality of communication devices; and a plurality of slave communication devices, the plurality of slave communication devices being others of the plurality of communication devices, wherein one or more of the communication devices are configured to assign a unique virtual routing number to each of a subset of the plurality of communication devices, and wherein each of the slave communication devices to which a virtual routing number has been assigned is configured to:

receive a wireless transmission of data from another of the communication devices, the wireless transmission containing a virtual routing number of the other communication device, the wireless transmission of data representing one hop in a transmission of data between two of the communication devices, determine a difference between the virtual routing number of the other communication device and the virtual routing number assigned to the slave communication device, and retransmit the data in an assigned time slot by waiting for a delay based on the determined difference.

12. The system of claim 11, wherein the communication devices are further configured to:

execute a discovery process wherein each of the plurality of slave communication devices is accessed by traversing a wireless communication path from the control communication device to the slave communication device, wherein the unique virtual routing number assigned to each of the subset of the plurality of communication devices is based on a number of hops traversed in the communication path from the control communication device to the slave communication device during the discovery process, and wherein any two virtual routing numbers are capable of being compared to determine that a first of the two numbers is based on a number of hops that is no greater than for a second of the two numbers.

13. The system of claim 12, wherein the virtual routing numbers are numbers assigned sequentially in an order in which the communication devices are accessed during the discovery process.

14. The system of claim 12, wherein each virtual routing number comprises a first portion identifying the number of hops traversed in the communication path and a second portion that is a distinguishing index.

15. The system of claim 11, wherein each of the slave communication devices to which a virtual routing number has been assigned is further configured to:

determine to retransmit the data, as opposed to not retransmitting the data, based on a comparison of the virtual routing number of the transmitting communication device and the virtual routing number assigned to the slave communication device.

16. The system of claim 11, wherein the transmission of data is from the control communication device to one of the slave communication devices.

17. The system of claim 16, wherein a length of a frame including all time slots allocated for the transmission of data is determined based on the virtual routing number of the one of the slave communication devices.

18. The system of claim 11, wherein the transmission of data is from one of the slave communication devices to the control communication device.

19. The system of claim 11, wherein the subset of the plurality of communication devices is a proper subset, and wherein a virtual routing number is not assigned to at least one of the slave communication devices.

20. The system of claim 11, wherein the virtual routing number assigned to each communication device is stored in the communication device.

\* \* \* \* \*